(12) United States Patent
Lounsbury

(10) Patent No.: US 9,327,422 B2
(45) Date of Patent: May 3, 2016

(54) SAW GUIDE FOR INCREASING A GAP BETWEEN DECK BOARDS

(71) Applicant: Peter Alden Lounsbury, Bainbridge Island, WA (US)

(72) Inventor: Peter Alden Lounsbury, Bainbridge Island, WA (US)

(*) Notice: Subject to any disclaimer, the term of this patent is extended or adjusted under 35 U.S.C. 154(b) by 270 days.

(21) Appl. No.: 14/185,917

(22) Filed: Feb. 20, 2014

(65) Prior Publication Data

US 2014/0230262 A1 Aug. 21, 2014

Related U.S. Application Data

(60) Provisional application No. 61/766,782, filed on Feb. 20, 2013.

(51) Int. Cl.
*B27B 9/04* (2006.01)
*G01B 5/25* (2006.01)

(52) U.S. Cl.
CPC .... *B27B 9/04* (2013.01); *G01B 5/25* (2013.01)

(58) Field of Classification Search
CPC .............. B27B 9/04; G01B 5/25; B25H 1/00; B23Q 9/00; B23Q 17/22
USPC ............................ 33/640, 645, 630, 465, 471
See application file for complete search history.

(56) References Cited

U.S. PATENT DOCUMENTS

| | | | | |
|---|---|---|---|---|
| 4,281,572 A * | 8/1981 | Stovall | ............ | B23Q 9/005 33/443 |
| 5,148,730 A * | 9/1992 | McCaw | ............ | B23Q 9/0042 33/403 |
| 6,708,422 B1 * | 3/2004 | Stojanovski | ............ | B23Q 9/005 33/42 |
| 6,763,754 B1 * | 7/2004 | Glenn | ............ | B23Q 9/0042 33/640 |
| 2003/0192192 A1 * | 10/2003 | Kirkland | ............ | B23Q 9/0042 33/640 |
| 2006/0026855 A1 * | 2/2006 | Haas | ............ | B23Q 17/2404 33/640 |
| 2014/0230262 A1 * | 8/2014 | Lounsbury | ............ | B27B 9/04 33/645 |
| 2014/0310968 A1 * | 10/2014 | Sherman | ............ | B25H 1/0078 33/759 |

* cited by examiner

*Primary Examiner* — Yaritza Guadalupe-McCall

(57) ABSTRACT

A saw guide for increasing a gap between deck boards is an apparatus that includes a base panel, a blade hole, a front guide tab, a back guide tab, a binding clamp, and an alignment rail. The apparatus is used in conjunction with a circular handheld saw to more precisely widen the gap between two deck boards. The circular handheld saw is mounted onto the base panel by the binding clamp. The blade of the circular handheld saw is positioned within the blade hole, and the alignment rail is used to properly orient the blade. The front guide tab and the second guide tab are located on opposite sides of the base panel and are used to guide the cutting direction of the circular handheld saw.

18 Claims, 6 Drawing Sheets

SAW GUIDE FOR INCREASING A GAP BETWEEN DECK BOARDS

The current application claims a priority to the U.S. Provisional Patent application Ser. No. 61/766,782 filed on Feb. 20, 2013.

FIELD OF THE INVENTION

The present invention generally relates to a power tool accessory. Furthermore, the present invention relates to circular saws. More specifically, the present invention is a circular saw guide attachment for trimming deck boards.

BACKGROUND OF THE INVENTION

Whether constructed at the same time a house is built or as a later addition, a deck is a common amenity found among households. It is important that a deck is properly installed in order to ensure a long lifespan and the safety of individuals. One of the most important aspects of installing a deck lies in the placement of the individual deck boards. Oftentimes deck boards are spaced too close to one another, either due to negligence of those installing the deck or due to the product they are working with. Deck boards that are spaced too closely are much more likely to collect and trap dirt and other debris between them. Over time, if the deck is not cleaned often, this debris will prevent water from properly draining from the deck. If the water is not able to properly drain, then it will remain between deck boards for an extended period of time. This stagnant water will cause the wood to rot overtime, thus compromising the integrity of the deck. This results in unsafe conditions for individuals using the deck and may lead to the need to replace the deck. Rather than replace individual deck boards that are too close to one another, it is easier to cut away a section of the deck boards using a circular saw in order to create a larger gap. However, improper cuts are easily made (i.e. not straight, too wide), especially with those who are not as experienced with using power tools. Not only can these improper cuts harm appearance of deck but they can also harm the structural integrity of the deck.

Therefore it is the object of the present invention to provide a universal circular saw guide for use with decks. The present invention can be attached to any existing circular saw and allows a user to make straight and consistent cuts along the gaps between deck boards.

DETAILED DESCRIPTIONS OF THE INVENTION

All illustrations of the drawings are for the purpose of describing selected versions of the present invention and are not intended to limit the scope of the present invention.

Figure 1:
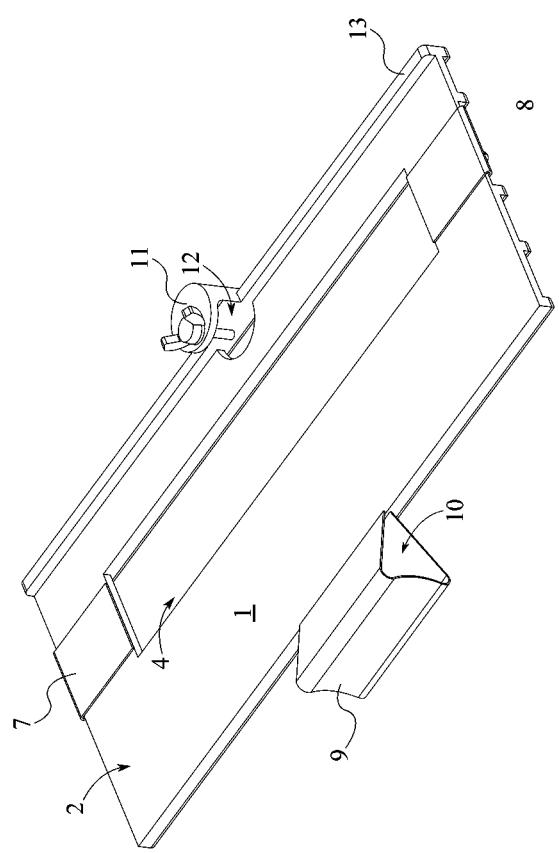
FIG. 1 is a top perspective view of the present invention.
Figure 2:
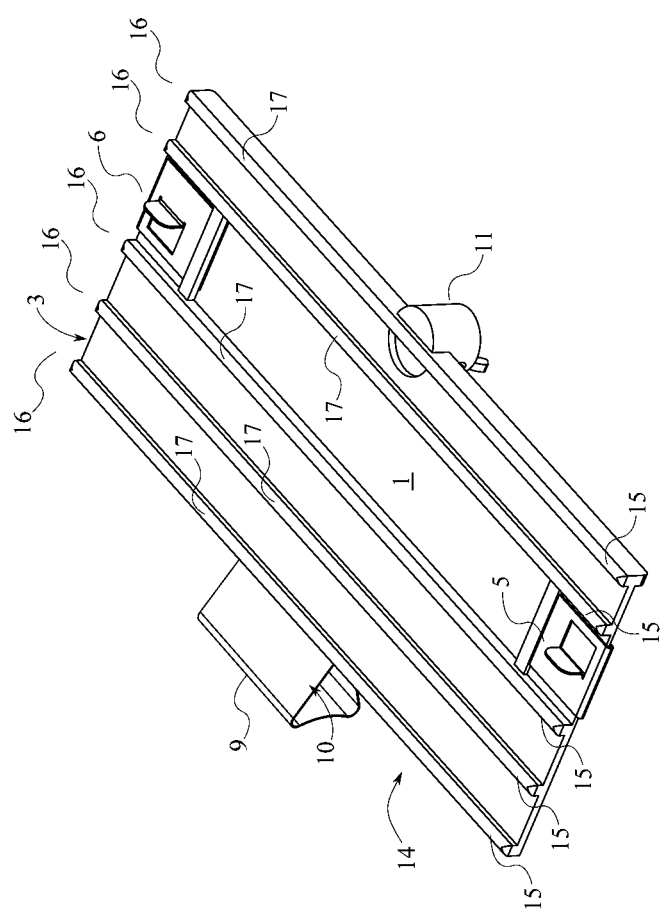
FIG. 2 is a bottom perspective view of the present invention.

As can be seen in FIGS. 1 and 2, the present invention is a saw guide that allows a user to guide a circular handheld saw through the gap between two deck boards. Moreover, the present invention allows the circular handheld saw to more precisely widen the gap between two deck boards. The present invention comprises a base panel 1, a blade hole 4, a front guide tab 5, a back guide tab 6, a binding clamp 11, and an alignment rail 13. The base panel 1 is the structural base for the present invention and allows the other components of the present invention to be connected together. The base panel 1 is also used to brace the saw base of a circular handheld saw. The blade hole 4 is positioned normal to the base panel 1 and traverses through the base panel 1, which allows the blade of a circular handheld saw to operate through the base panel 1. The front guide tab 5 and the back guide tab 6 are inserted into the gap between two deck boards, which allows the front guide tab 5 and the back guide tab 6 to move the present invention and the attached saw along the gap. The front guide tab 5 and the second guide tab are both positioned perpendicular to the base panel 1. In addition, the front guide tab 5 is positioned adjacent to the blade hole 4, and the back guide tab 6 is positioned adjacent to the blade hole 4 opposite to the front guide tab 5 so that the blade of a circular handheld saw is guided from both the front and the back. In order to align the front guide tab 5 and the back guide tab 6 with the blade of a circular handheld saw, the front guide tab 5 and the back guide tab 6 needs to be aligned parallel to each other and parallel to the length of the blade hole 4. The saw base of a circular handheld saw is pressed against the alignment rail 13 so that the blade of the circular handheld saw is properly positioned into the blade hole 4. Thus, the alignment rail 13 needs to be positioned adjacent and along the blade hole 4 and to be connected perpendicular to the top surface 2 of the base panel 1. The binding clamp 11 is integrated into the alignment rail 13 and the base panel 1 so that the binding clamp 11 can secure the saw base of a circular handheld saw once the saw base is aligned against the alignment rail 13.

Figure 5:
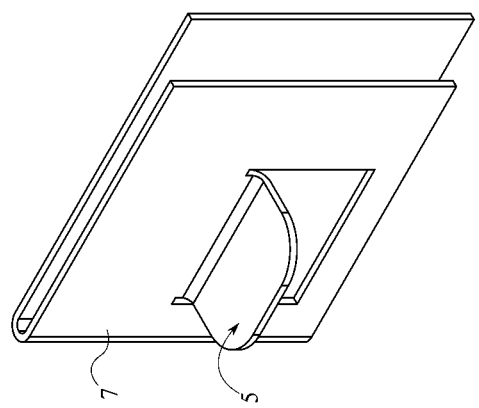
FIG. 5 is a perspective view of a guide tab for the present invention.
Figure 6:
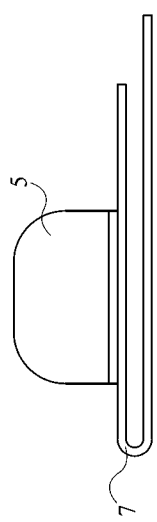
FIG. 6 is a side view of a guide tab for the present invention.

In the preferred embodiment, the present invention further comprises a front U-shaped clip 7 and a back U-shaped clip 8, which are shown in FIGS. 5 and 6, in order to situate the front guide tab 5 and the back guide tab 6. The front guide tab 5 is connected adjacent and perpendicular to the front U-shaped clip 7 in such a manner that the front U-shaped clip 7 can slidably engage to the base panel 1 and the front guide tab 6 can still have the orientation described above. This allows the user to slide and adjust the positioning of the front guide tab 5 so that the front guide tab 5 is aligned with the cutting direction of the attached saw. The front U-shaped clip 7 is then adhered to the base panel 1 in order hold in place the front U-shaped clip 7 and, more importantly, the front guide tab 5. The adherence between the front U-shaped clip 7 and the base panel 1 can be broken in case the user wants to reposition the front guide tab 5. Similarly, the back guide tab 6 is connected adjacent and perpendicular to the back U-shaped clip 8 in such a manner that the back U-shaped clip 8 can slidably engage to the base panel 1 and the back guide tab 6 can still have the orientation described above. This allows the user to slide and adjust the positioning of the back guide tab 6 so that the back guide tab 6 is aligned with the cutting direction of the attached saw and is aligned with the front guide tab 5. The back U-shaped clip 8 is then adhered to the base panel 1 in order hold in place the back U-shaped clip 8 and, more importantly, the back guide tab 6. The adherence between the back U-shaped clip 8 and the base panel 1 can be broken in case the user wants to reposition the back guide tab 6.

Figure 3:
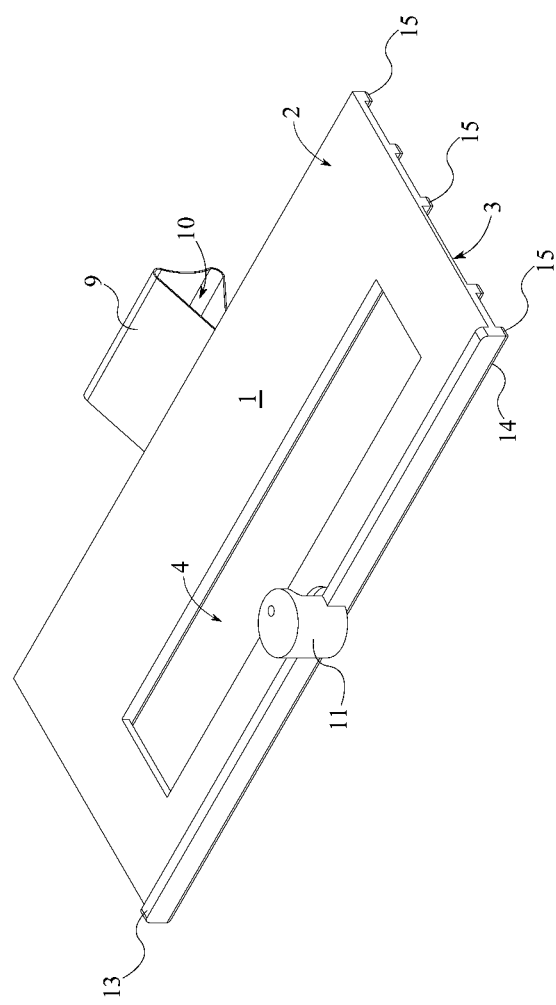
FIG. 3 is a top perspective view of the present invention without the guide tabs.

As can be seen in FIG. 3, the binding clamp 11 allows the present invention to be secured to the saw base of a circular handheld saw. The binding clamp 11 comprises a clamp opening 12, which is used to receive the side of a saw base before actuating the binding clamp 11. Thus, the clamp opening 12 is positioned adjacent to the top surface 2 and oriented towards the blade hole 4 so that the user can easily insert the side of a saw base into the clamp opening 12 as the user slides the saw base across the top surface 2 and properly orients the saw base against the alignment rail 13. In the preferred embodiment of the present invention, the binding clamp 11 uses a thumb screw engaged to a threaded shaft in order to clamp the present invention to a saw base.

In addition to the binding clamp 11, the present invention further comprises a binding clip 9, which is used to further secure a saw base to the present invention. The binding clip 9 does not tightly clamp down on the base panel 1 but still holds the base panel 1 in place. The binding clamp 11 and the binding clip 9 to the positioned opposite to each other across the base panel 1 so that the present invention can evenly secure a saw base from opposite sides. The binding clip 9 is also integrated into the base panel 1 so that the binding clip 9 is readily available to the user. The binding clip 9 comprises a clip opening 10, which is used to receive the side of a saw base. Thus, the clip opening 10 is positioned adjacent to the top surface 2 and oriented towards the blade hole 4 so that the user can easily insert the side of a saw base into the clip opening 10 as the user slides the saw base across the top surface 2 and properly orients the saw base against the alignment rail 13. In the preferred embodiment of the present invention, the binding clip 9 resembles and functions like a binder clip.

Figure 4:
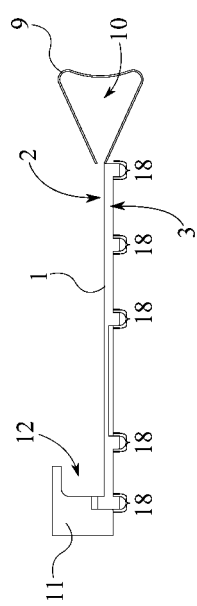
FIG. 4 is a side view of the present invention without the guide tabs.

As can be seen in FIG. 4, the present invention further comprises a plurality of runners 14 in order to reduce the friction between the bottom surface 3 of the base panel 1 and the top surface of deck boards as the present invention is used with the circular handheld saw to cut and widen the gap between two deck boards. The plurality of runners 14 is positioned parallel to each other and is positioned parallel to the length of the blade hole 4 so that the plurality of runners 14 is oriented in the in the cutting direction of a circular handheld saw attached to the present invention. The plurality of runners 14 is also distributed across the base panel 1, which allows the plurality of runners 14 to evenly support the present invention on the top surface of deck boards. Each of the plurality of runners 14 is connected perpendicular to the bottom surface 3 so that the plurality of runners 14 can properly contact the top surface of deck boards. In addition, each of the plurality of runners 14 comprises a first slanted end 15, a second slanted end 16, and a runner body 17. The cross-section of the runner body 17 is a semi-circular arch shape 18. The semi-circular arch shape 18 is oriented away from the bottom surface 3, which reduces the contact surface between the plurality of runners 14 and the deck boards and, thus, further reduces the friction between the plurality of runners 14 and the deck boards. The first slanted end 15 and the second slanted end 16 allows the runner body 17 to better navigate over bumps and grooves in the deck boards. The first slanted end 15 is used while the present invention is moving in one direction, and the second slanted end 16 is used while the present invention is moving the opposite direction. Thus, the first slanted end 15 and the second slanted end 16 are positioned opposite to each other along the runner body 17.

Although the invention has been explained in relation to its preferred embodiment, it is to be understood that many other possible modifications and variations can be made without departing from the spirit and scope of the invention as hereinafter claimed.

What is claimed is:

1. A saw guide for increasing a gap between deck boards comprises:
    a base panel with a top surface and a bottom surface;
    a blade hole;
    a front guide tab;
    a back guide tab;
    a binding clamp;
    an alignment rail;
    said blade hole being positioned normal to said base panel;
    said blade hole traversing through said base panel;
    said front guide tab being positioned perpendicular to said base panel;
    said back guide tab being positioned perpendicular to said base panel;
    said front guide tab being positioned adjacent to said blade hole;
    said back guide tab being positioned adjacent to said blade hole opposite to said front guide tab;
    said front guide tab and said back guide tab being aligned parallel with each other and with length of said blade hole;
    said alignment rail being positioned adjacent and along said blade hole;
    said alignment rail being connected perpendicular to said top surface; and
    said binding clamp being integrated into said alignment rail and said base panel.

2. The saw guide for increasing a gap between deck boards as claimed in claim 1 comprises:
    a front U-shaped clip;
    said front guide tab being connected adjacent and perpendicular to said front U-shaped clip;
    said front U-shaped clip being slidably engaged to said base panel; and
    said front U-shaped clip being breakably adhered to said base panel.

3. The saw guide for increasing a gap between deck boards as claimed in claim 1 comprises:
    a back U-shaped clip;
    said back guide tab being connected adjacent and perpendicular to said back U-shaped clip;
    said back U-shaped clip being slidably engaged to said base panel; and
    said back U-shaped clip being breakably adhered to said base panel.

4. The saw guide for increasing a gap between deck boards as claimed in claim 1 comprises:
    said binding clamp comprises a clamp opening;
    said clamp opening being positioned adjacent to said top surface; and
    said clamp opening being oriented towards said blade hole.

5. The saw guide for increasing a gap between deck boards as claimed in claim 1 comprises:
    a binding clip;
    said binding clip and said binding clamp being positioned opposite to each other across said base panel; and
    said binding clip being integrated into said base panel.

6. The saw guide for increasing a gap between deck boards as claimed in claim 5 comprises:
    said binding clip comprises a clip opening;
    said clip opening being positioned adjacent to said top surface; and
    said clip opening being oriented towards said blade hole.

7. The saw guide for increasing a gap between deck boards as claimed in claim 1 comprises:
  a plurality of runners;
  said plurality of runners being positioned parallel to each other;
  said plurality of runners being positioned parallel to said length of said blade hole;
  said plurality of runners being distributed across said base panel; and
  each of said plurality of runners being connected perpendicular to said bottom surface.

8. The saw guide for increasing a gap between deck boards as claimed in claim 7 comprises:
  each of said plurality of runners comprises a first slanted end, a second slanted end, and a runner body; and
  said first slanted end and said second slanted end being positioned opposite to each other along said runner body.

9. The saw guide for increasing a gap between deck boards as claimed in claim 8 comprises:
  a cross-section of said runner body being an semi-circular arch shape; and
  said semi-circular arch shape being oriented away from said bottom surface.

10. A saw guide for increasing a gap between deck boards comprises:
  a base panel with a top surface and a bottom surface;
  a blade hole;
  a front guide tab;
  a back guide tab;
  a back U-shaped clip;
  a front U-shaped clip;
  a binding clamp;
  an alignment rail;
  said blade hole being positioned normal to said base panel;
  said blade hole traversing through said base panel;
  said front guide tab being positioned perpendicular to said base panel;
  said back guide tab being positioned perpendicular to said base panel;
  said front guide tab being positioned adjacent to said blade hole;
  said back guide tab being positioned adjacent to said blade hole opposite to said front guide tab;
  said front guide tab and said back guide tab being aligned parallel with each other and with length of said blade hole;
  said alignment rail being positioned adjacent and along said blade hole;
  said alignment rail being connected perpendicular to said top surface;
  said binding clamp being integrated into said alignment rail and said base panel;
  said front guide tab being connected adjacent and perpendicular to said front U-shaped clip;
  said front U-shaped clip being slidably engaged to said base panel;
  said front U-shaped clip being breakably adhered to said base panel;
  said back guide tab being connected adjacent and perpendicular to said back U-shaped clip;
  said back U-shaped clip being slidably engaged to said base panel; and
  said back U-shaped clip being breakably adhered to said base panel.

11. The saw guide for increasing a gap between deck boards as claimed in claim 10 comprises:
  said binding clamp comprises a clamp opening;
  said clamp opening being positioned adjacent to said top surface; and
  said clamp opening being oriented towards said blade hole.

12. The saw guide for increasing a gap between deck boards as claimed in claim 10 comprises:
  a binding clip;
  said binding clip and said binding clamp being positioned opposite to each other across said base panel;
  said binding clip being integrated into said base panel;
  said binding clip comprises a clip opening;
  said clip opening being positioned adjacent to said top surface; and
  said clip opening being oriented towards said blade hole.

13. The saw guide for increasing a gap between deck boards as claimed in claim 10 comprises:
  a plurality of runners;
  said plurality of runners being positioned parallel to each other;
  said plurality of runners being positioned parallel to said length of said blade hole;
  said plurality of runners being distributed across said base panel; and
  each of said plurality of runners being connected perpendicular to said bottom surface.

14. The saw guide for increasing a gap between deck boards as claimed in claim 13 comprises:
  each of said plurality of runners comprises a first slanted end, a second slanted end, and a runner body;
  said first slanted end and said second slanted end being positioned opposite to each other along said runner body;
  a cross-section of said runner body being an semi-circular arch shape; and
  said semi-circular arch shape being oriented away from said bottom surface.

15. A saw guide for increasing a gap between deck boards comprises:
  a base panel with a top surface and a bottom surface;
  a blade hole;
  a front guide tab;
  a back guide tab;
  a binding clamp;
  an alignment rail;
  a plurality of runners;
  said blade hole being positioned normal to said base panel;
  said blade hole traversing through said base panel;
  said front guide tab being positioned perpendicular to said base panel;
  said back guide tab being positioned perpendicular to said base panel;
  said front guide tab being positioned adjacent to said blade hole;
  said back guide tab being positioned adjacent to said blade hole opposite to said front guide tab;
  said front guide tab and said back guide tab being aligned parallel with each other and with length of said blade hole;
  said alignment rail being positioned adjacent and along said blade hole;
  said alignment rail being connected perpendicular to said top surface;
  said binding clamp being integrated into said alignment rail and said base panel;

said plurality of runners being positioned parallel to each other;
said plurality of runners being positioned parallel to said length of said blade hole;
said plurality of runners being distributed across said base panel; and
each of said plurality of runners being connected perpendicular to said bottom surface.

16. The saw guide for increasing a gap between deck boards as claimed in claim 15 comprises:
a front U-shaped clip;
a back U-shaped clip;
said front guide tab being connected adjacent and perpendicular to said front U-shaped clip;
said front U-shaped clip being slidably engaged to said base panel;
said front U-shaped clip being breakably adhered to said base panel;
said back guide tab being connected adjacent and perpendicular to said back U-shaped clip;
said back U-shaped clip being slidably engaged to said base panel; and
said back U-shaped clip being breakably adhered to said base panel.

17. The saw guide for increasing a gap between deck boards as claimed in claim 15 comprises:
a binding clip;
said binding clip comprises a clip opening;
said binding clamp comprises a clamp opening;
said clamp opening being positioned adjacent to said top surface;
said clamp opening being oriented towards said blade hole;
said binding clip and said binding clamp being positioned opposite to each other across said base panel;
said binding clip being integrated into said base panel;
said clip opening being positioned adjacent to said top surface; and
said clip opening being oriented towards said blade hole.

18. The saw guide for increasing a gap between deck boards as claimed in claim 15 comprises:
each of said plurality of runners comprises a first slanted end, a second slanted end, and a runner body;
said first slanted end and said second slanted end being positioned opposite to each other along said runner body;
a cross-section of said runner body being an semi-circular arch shape; and
said semi-circular arch shape being oriented away from said bottom surface.

* * * * *